United States Patent [19]
Kano

[11] Patent Number: 5,758,156
[45] Date of Patent: May 26, 1998

[54] METHOD AND APPARATUS OF TESTING PROGRAMS

[75] Inventor: Yuichi Kano, Kawasaki, Japan

[73] Assignee: Fujitsu Limited, Kawasaki, Japan

[21] Appl. No.: 494,060

[22] Filed: Jun. 23, 1995

[30] Foreign Application Priority Data

Jul. 15, 1994 [JP] Japan ................................. 6-164415

[51] Int. Cl.⁶ ............................................ G06F 11/00
[52] U.S. Cl. ............................................... 395/653
[58] Field of Search ....................................... 395/653

[56] References Cited

U.S. PATENT DOCUMENTS 5,371,883 12/1994 Gross et al. ................. 395/183.14

*Primary Examiner*—James P. Trammell
*Assistant Examiner*—John Q. Chavis
*Attorney, Agent, or Firm*—Staas & Halsey

[57] ABSTRACT

After reading catalog data corresponding to test items previously stored in a recording medium via a medium handling unit, a correcting section retrieves a device address portion in the catalog data based on a table or the like, and corrects the device address portion in accordance with the actual hardware configuration or invalidates a command line in the catalog data, which includes the name of a device which is not used in the actual hardware configuration. A command developing section develops the corrected catalog data to an operator command by referring to a correlation table between the catalog data and operator command, which is stored in a correlation table storage. A program test is executed based on this developed operator command.

10 Claims, 14 Drawing Sheets

| DEVICE ADDRESS | DEVICE NAME | OPTIONAL FUNCTION ATTRIBUTE | | |
|---|---|---|---|---|
| 0280 | X1 | OP1 | OP2 | |
| 0281 | X1 | OP1 | OP2 | |
| 0282 | X1 | OP1 | | |
| 0380 | X2 | OP3 | OP4 | |
| 0382 | X2 | OP3 | OP5 | |
| 0400 | Y1 | OP6 | OP7 | OP8 |
| 0401 | Y1 | OP6 | OP7 | OP8 |

FIG. 5

| COMMAND TYPE | FIRST PARAMETER | SECOND PARAMETER | THIRD AND SUBSEQUENT PARAMETERS |
|---|---|---|---|
| E X | DEVICE ADDRESS | DEVICE NAME | OPTIONAL FUNCTION NAME |
| D I S P | DEVICE NAME | — | — |

| DEVICE NAME | PROGRAM NAME | OPTIONAL FUNCTION | PARAMETER |
|---|---|---|---|
| X1 | TMP1 | OP1 | P1 |
|  |  | OP2 | P2 |
| X2 | TMP2 | OP3 | P3 |
|  |  | OP4 | P4 |
|  |  | OP5 | P5 |
| Y1 | TMP3 | OP6 | P6 |
|  |  | OP7 | P7 |
|  |  | OP8 |  |

FIG. 8

```
START TMP1, (280-281), P1, P2
START TMP1, 282, P1
START TMP2, 380, P3, P4
START TMP2, 382, P3, P5
START TMP3, (400-401), P6, P7, P8
```

FIG. 11

| PROGRAM NAME | VERSION NUMBER | TIME STAMP | PROGRAM SIZE |
|---|---|---|---|
| A | 0101 | 930630 | X'000100' |
| B | 0101 | 920117 | X'000100' |
| TMP1 | 0203 | 930715 | X'010000' |
| TMP2 | 0501 | 930715 | X'0001A0' |

FIG. 12

| PROGRAM NAME | VERSION NUMBER | TIME STAMP | PROGRAM SIZE |
|---|---|---|---|
| A | 0102 | 930715 | X'0001B0' |
| B | 0101 | 920117 | X'000100' |
| TMP1 | 0204 | 930715 | X'010010' |
| TMP2 | 0501 | 930715 | X'0001A0' |
| TMP3 | 0101 | 930720 | X'000100' |

FIG. 13

| PROGRAM NAME | VERSION NUMBER | TIME STAMP | PROGRAM SIZE | |
|---|---|---|---|---|
| A | 0102 | 930715 | X'0001B0' | MODIFIED |
| TMP1 | 0204 | 930715 | X'010010' | MODIFIED |
| TMP3 | 0101 | 930720 | X'000100' | NEW |

FIG. 14

| DEVICE NAME | PROGRAM NAME |
|---|---|
| T1 | A |
| X1 | TMP1 |
| X2 | TMP2 |
| Y1 | TMP3 |

| COMMAND NAME | FIRST PARAMETER | SECOND PARAMETER | THIRD AND SUBSEQUENT PARAMETERS |
|---|---|---|---|
| E X | DEVICE ADDRESS | DEVICE NAME | OPTIONAL FUNCTION NAME |
| S T A R T | PROGRAM NAME | DEVICE ADDRESS | PARAMETER |

FIG. 17

```
START TMP1, (280-281), P1, P2
START TMP1, 282, P1
START TMP3, (400-401), P6, P7, P8
```

FIG. 21

| PROGRAM NAME | FIRST PARAMETER | SECOND PARAMETER | THIRD PARAMETER |
|---|---|---|---|
| TMP1 | P1 | P2 | |
| TMP2 | P3 | P4 | P5 |
| TMP3 | P6 | | |

FIG. 22

(XXX-XXX) = (XXX, XXX, XXX)

FIG. 23

```
START TMP1, (280-281), P1, P2
START TMP1, (280-281), P1
START TMP1, (280-281), , P2
START TMP1, (280-281)
START TMP1, (280, 281), P1, P2
START TMP1, (280, 281), P1
START TMP1, (280, 281), , P2
START TMP1, (280, 281)

START TMP1, 282, P1, P2
START TMP1, 282, P1
START TMP1, 282, , P2
START TMP1, 282
```

METHOD AND APPARATUS OF TESTING PROGRAMS

BACKGROUND OF THE INVENTION

1. Field of the Invention

The present invention relates to a method and apparatus of testing a control program, a test program and other execution programs in a computer system.

2. Description of the Related Art

To check the reliability of programs in a computer system, such as a control program, a test program and other execution programs, a program test is performed.

Such a test for checking the properness of programs is performed, for example, when a new program is developed, when a program itself is modified due to a version-up or when a system which runs a program is modified. Items which should be checked against by this program test include items common to various programs. That is, the program test is performed on quite common test items or on test items which are partially common. The partially common test items are tested after the non-common parts are corrected in each test. The program test is generally performed by executing operator commands. If an operator should input all the operator commands manually every time a test is to be performed, the operation is troublesome.

In this respect, catalog data including commands, and device addresses, etc. for the necessary test items is stored together with the name of the catalog data into a recording medium, the catalog data is read from the recording medium at the time of testing a program, and the catalog data is converted to operator commands to be used in the test. A plurality of such catalog data are often prepared in association with various kinds of tests. To test a program, therefore, the necessary catalog data is specified by the catalog data name and is read out from the recording medium. If typical catalog data is prepared as model or reference data, one can cope with various situations by slightly modifying this reference catalog data and converting the modified catalog data to operator commands to be used in the program test.

More specifically, the hardware configuration of the system which executes a program is modified in various forms and the operation of the program is checked against similar test items, the catalog name as a reference (model) is designated every time, the hardware configuration of the system is further checked, and the device address in the catalog data is changed according to the checked result. If the system hardware includes no device corresponding to the device name in the catalog data at this time, the associated command line is changed to a comment line (which will not be executed) to become invalid or is deleted before being tested.

In some case, a new program or a modified program may be tested instead of testing the system using all the devices coupled to the system hardware.

In this case, a new program or a modified program is checked based on the reference catalog data and the catalog data is newly and manually corrected.

Further, when default values are set as the specifications of the parameters of operator commands, it is necessary to check the operation in both of the cases where for the default values, the parameters are "clearly" specified or the default values are specifically designated and where the default values are not specifically designated (the default values are automatically selected when the parameters are not specifically designated), i.e., the default values are "unspecifically" designated.

As described above, at the time the hardware configuration of the system is checked and the device address in the reference catalog data is changed according to the checking result before being tested, to invalidate a command line associated with a device which is not included in the system hardware, the reference catalog data should be corrected manually to change the command line to a comment line or to delete the command line.

The manual correction takes time and is likely to cause an operational error. It also takes time to check the system configuration.

In testing a new program or modified program, the content of the new program or modified program should be checked and the reference catalog data should be corrected manually.

In this case too, it is likely that an operational error occurs in the checking of the content of the program and the correction of the reference catalog data, and this correction takes time.

Further, if it is necessary to check the operation in both the cases where the default values are specifically designated and where the default values are not specifically designated, it is not possible to check the properness about how to designate various kinds of parameters when the operational specification is such that the catalog data is automatically converted to an operator command when and only when the catalog data is executed or when an operator command and a parameter cannot be designated directly.

SUMMARY OF THE INVENTION

Accordingly, it is an object of the present invention to provide a program testing method and a program testing apparatus for automating a program test by effectively using catalog data, reducing operational error in testing a program and ensuring reliable testing in a short period of time.

A program testing method according to the first aspect of this invention includes an information extracting step for extracting system information corresponding to catalog information of test items for testing a target program from system configuration information about a structure of a hardware system for executing the target program, the system configuration information being previously included in the target program;

a reference catalog reading step for reading reference catalog information of test items previously prepared for testing a program;

a catalog correcting step for automatically correcting the reference catalog information based on system information corresponding to the catalog information and a predetermined command format; and a command developing step for associating a predetermined operator command with corrected catalog information to develop the catalog information to an operator command and using the operator command in testing the program.

The method according to the first aspect of this invention may further include an unmodified program extracting step for reading program information consisting of at least partial information including a program name among information about a name of each program, a version number, a time stamp and a program size from a medium for providing an unmodified program and a medium for providing a modified program, and extracting unmodified program name information for which the program information in both media fully match with each other; and the catalog correcting step in this method may include an unmodified item invalidating step for invalidating catalog information corresponding to individual programs associated with the unmodified program name information. The method according to the first aspect of this invention may further comprise a condition registering step for previously registering condition information of a command development about a variation in a command format of an operator command; and the command developing step in this method may include a step of executing a development to an operator command in accordance with registered condition information.

A program testing method according to the second aspect of this invention includes an unmodified program extracting step for reading program information consisting of at least partial information including a program name among information about a name of each program, a version number, a time stamp and a program size from a medium for providing an unmodified program and a medium for providing a modified program, and extracting unmodified program name information for which the program information in both media fully match with each other;

a reference catalog reading step for reading reference catalog information of test items previously prepared for testing a program;

a catalog correcting step for automatically correcting the reference catalog information to invalidate catalog information corresponding to system information corresponding to individual programs associated with the unmodified program name information; and a command developing step for associating corrected catalog information with a predetermined operator command to develop the catalog information to an operator command and using the operator command in testing the program.

The method according to the second aspect of this invention may further comprise a condition registering step for previously registering condition information of a command development about a variation in a command format of an operator command; and the command developing step of this method may include a step of executing a development to an operator command in accordance with registered condition information.

A program testing apparatus according to the third aspect includes an information extracting section for extracting system information corresponding to catalog information of test items for testing a target program from system configuration information about a structure of a hardware system for executing the target program, the system configuration information being previously included in the target program;

a reference catalog reading section for reading reference catalog information from an information providing medium;

a command format storage for storing a command format of commands used in the catalog information;

a catalog correcting section for correcting the reference catalog information based on the system information and the command format;

a correlation information storage for storing correlation information of a correlation between the catalog information and an operator command; and a command developing section for associating a predetermined operator command with catalog information, corrected by the catalog correcting section based on the correlation information, to develop the catalog information to an operator command to be used in testing the program.

The apparatus according to the third aspect of this invention may further include a program information reading section for reading program information consisting of at least partial information including a program name among information about a name of each program, a version number, a time stamp and a program size from a medium for providing an unmodified program and a medium for providing a modified program; and an unmodified program extracting section for extracting unmodified program name information for which the program information in both media fully match with each other; and the catalog correcting section in this apparatus may include an unmodified item invalidating section for invalidating catalog information corresponding to individual programs associated with the unmodified program name information.

The apparatus according to the third aspect of this invention may further include a condition registering section for previously registering condition information of a command development about a variation in a command format of an operator command; and the command developing section of this apparatus may include an element for executing a development to an operator command in accordance with the registered condition information.

A program testing apparatus according to the fourth aspect of this invention includes a program information reading section for reading program information consisting of at least partial information including a program name among information about a name of each program, a version number, a time stamp and a program size from a medium for providing an unmodified program and a medium for providing a modified program;

an unmodified program extracting section for extracting unmodified program name information for which the program information in both media fully match with each other;

a reference catalog reading section for reading reference catalog information of test items for testing a program, from an information providing medium;

a catalog correcting section for correcting the reference catalog information to invalidate catalog information corresponding to system information corresponding to individual programs associated with the unmodified program name information;

a correlation information storage section for storing correlation information of a correlation between the catalog information and an operator command; and a command developing section for associating a predetermined operator command with catalog information, corrected by the catalog correcting section based on the correlation information, to develop the catalog information to an operator command to be used in testing the program.

The apparatus according to the fourth aspect of this invention may further include a condition registering section for previously registering condition information of a command development about a variation in a command format of an operator command; and the command developing section of this apparatus may include an element for executing a development to an operator command in accordance with the registered condition information.

According to the program testing method and apparatus of the present invention, reference catalog information is corrected based on at least one of system information and information about a modification of a program, and a predetermined command format and the corrected catalog information is developed to a predetermined operator command to be used in the program test, so that catalog data is effectively used to automate a program test, thereby reducing operational errors in the program test and that a reliable test can be performed in a short period of time.

More specifically, in testing with a system having a hardware configuration which does not match with the reference catalog data, the correction of the desired device address and the invalidation of a command line associated with a target device for the test which is not included in the system are automated to prevent the occurrence of an operation error and shorten the time for the correction and thus shorten the testing time.

In testing a new or a modified program, catalog data which has invalidated an individual program corresponding to the unmodified portion of the reference catalog data equivalent to an unmodified program is automatically produced to prevent the occurrence of an operational error and reduce the time for checking the new or modified program and the time for the correction involved in this checking.

In checking the specification of an operator command which becomes the same process even in different formats, one or more operator commands according to the variation in the command format are automatically produced from a command in reference catalog data to check the properness of the program with respect to the variation of the command format.

BRIEF DESCRIPTION OF THE DRAWINGS

Other objects and advantages of the invention will become apparent during the following discussion in conjunction with the accompanying drawings, in which:

FIG. 5 is an exemplary diagram showing one example of a command format table of catalog data for explaining the operation of the program testing system in FIG. 1;

FIG. 6 is an exemplary diagram showing one example of corrected catalog data for explaining the operation of the program testing system in FIG. 1;

FIG. 7 is an exemplary diagram showing one example of a catalog data-operator command correlation table for explaining the operation of the program testing system in FIG. 1;

FIG. 8 is an exemplary diagram showing one example of a developed operator command for explaining the operation of the program testing system in FIG. 1;

FIG. 11 is an exemplary diagram showing one example of an old program information table for explaining the operation of the program testing system in FIG. 9;

FIG. 12 is an exemplary diagram showing one example of a new program information table for explaining the operation of the program testing system in FIG. 9;

FIG. 13 is an exemplary diagram showing one example of a non-coincidence table for explaining the operation of the program testing system in FIG. 9;

FIG. 14 is an exemplary diagram showing one example of a catalog data-operator command correlation table showing the correlation between devices and programs for explaining the operation of the program testing system in FIG. 9;

FIG. 15 is an exemplary diagram showing one example of corrected catalog data for explaining the operation of the program testing system in FIG. 9;

FIG. 16 is an exemplary diagram showing one example of a catalog data-operator command correlation table showing the correlation between corrected command formats and operator commands for explaining the operation of the program testing system in FIG. 9;

FIG. 17 is an exemplary diagram showing one example of a developed operator command for explaining the operation of the program testing system in FIG. 9;

FIG. 21 is an exemplary diagram showing one example of a default information table for explaining the operation of the program testing system in FIG. 18;

FIG. 22 is an exemplary diagram showing one example of device address format information for explaining the operation of the program testing system in FIG. 18; and FIG. 23 is an exemplary diagram showing one example of a developed operator command for explaining the operation of the program testing system in FIG. 18.

DETAILED DESCRIPTION OF THE PREFERRED EMBODIMENTS

Program testing systems according to specific embodiments of the present invention will now be described referring to the accompanying drawings.

First Embodiment

Figure 1:
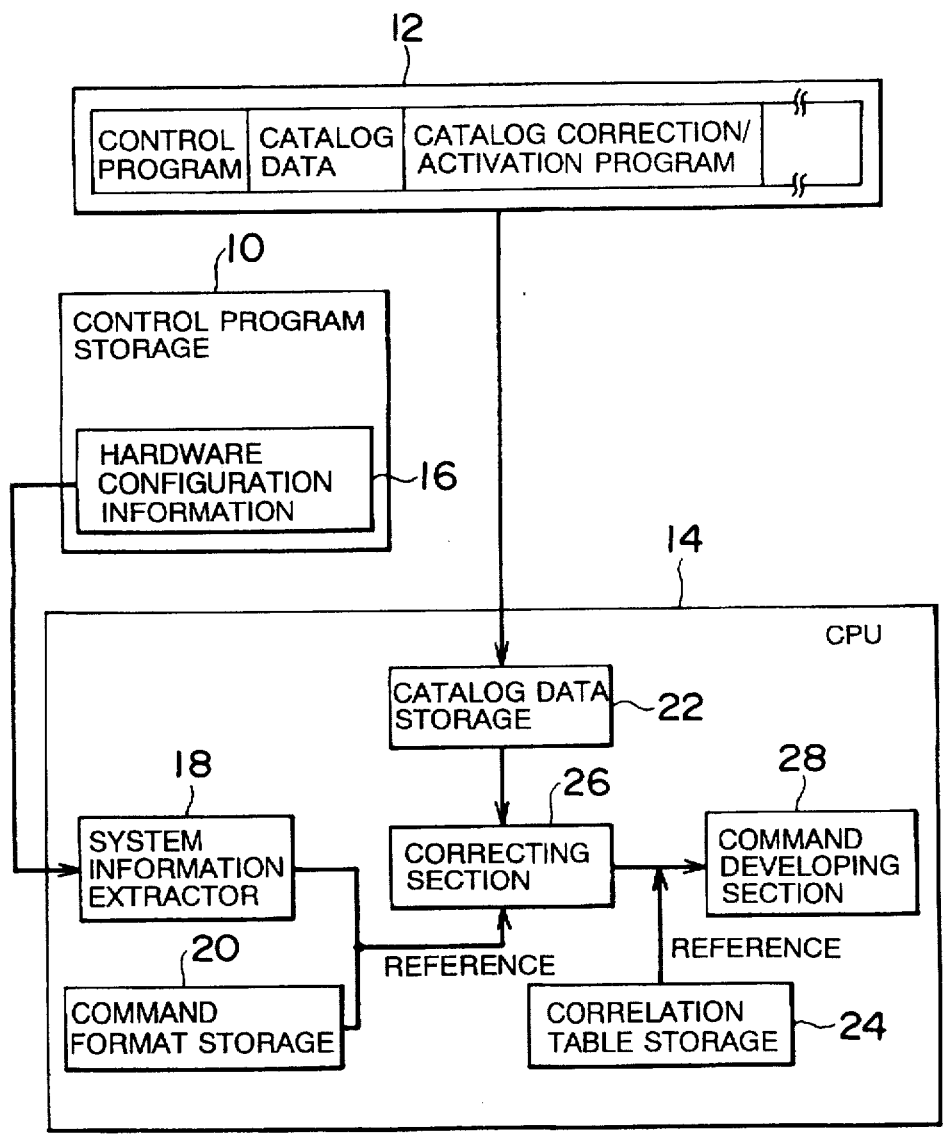
FIG. 1 is a block diagram illustrating the structure of a program testing system according to a principal first embodiment of the present invention.

FIG. 1 shows the structure of a program testing system according to the first embodiment of this invention. The program testing system in FIG. 1, which is designed to execute a program test in an ordinary computer system, comprises a control program storage 10, a medium handling unit 12 and a central processing unit (CPU) 14.

The control program storage 10 is a part of a main memory (not specifically illustrated) provided in, for example, the CPU 14. A control program stored in this control program storage 10 is a system control program including an operating system and the like, for example, so that hardware configuration information 16 of the system can be obtained from the control program. The medium handling unit 12, which is a disk apparatus, for example, accesses a recording medium such as a disk where the control program, catalog data and a catalog correction/activation program are stored.

The control program is loaded into the control program storage 10 and is executed by the CPU 14. The control program is normally loaded in advance in the control program storage 10 at the time the system is activated. Further, the control program is read from the recording medium and is loaded into the control program storage 10 as needed by the medium handling unit 12. The catalog data includes commands corresponding to test items for reference or the execution of a test, and device addresses. The catalog correction/activation program is loaded into the main memory incorporated in the CPU 14 and is executed by the CPU 14 to correct the catalog data, develop corrected catalog data to an operator command and execute an operator command to activate a test program.

The CPU 14 has a system information extractor 18, a command format storage 20, a catalog data storage 22, a correlation table storage 24, a correcting section 26 and a command developing section 28. The command format storage 20, catalog data storage 22 and correlation table storage 24 are a part of the main memory, for example. The correcting section 26 and the command developing section 28 are functional portions which are established by executing the catalog correction/activation program by the CPU 14.

The system information extractor 18 extracts system information from the hardware configuration information in the control program stored in the control program storage 10, and stores the system information in the form of a table in, for example, the main memory. This system information corresponds to catalog information of test items for a program test, and includes the device addresses of devices constituting the system, device names and optional functions, for example.

The command format storage 20 stores a command format which is syntax information of commands used in catalog data. The catalog data storage 22 stores catalog data which is read by the medium handling unit 12 from a recording medium provided for a test. The correlation table storage 24 stores a correlation table showing the correlation between catalog data and operator commands.

The correcting section 26 automatically corrects reference catalog data based on the aforementioned system information and a predetermined command format. The reference catalog data is read from a recording medium and is stored into the catalog data storage 22 by the medium handling unit 12. As mentioned above, the system information is extracted and stored in the main memory by the system information extractor 18, and the command format is stored in the command format storage 20. Based on the system information and command format, the correcting section 26 corrects the reference catalog data.

The command developing section 28 refers to the catalog data-operator command correlation table, stored in the correlation table storage 24, to associate catalog data, to which the necessary correction has been made by the correcting section 26, with a predetermined operator command, and develops the catalog data to an operator command. Further, the command developing section 28 tests the program by the execution of the developed operator command.

The operation of the thus constituted program testing system will be described below. In performing a test with a system having a different hardware configuration from the reference catalog data, the correction of device addresses and the correction of a command line for the name of a target device for the test, which does not actually exist, are automatically performed in the following manner.

The catalog correction/activation program functions under the control program where the hardware configuration information of the system is set, under the control of the CPU 14. The catalog correction/activation program permits the system information extractor 18 to extract system information including device addresses, device names and optional functions necessary for the correction of catalog data from the hardware configuration information 16 in the control program stored in the control program storage 10, and to set a system information table. A table where a command format used in catalog data is registered is previously set and stored in the command format storage 20.

For example, after catalog data corresponding to test items stored previously in the recording medium is read and loaded in the catalog data storage 22 via the medium handling unit 12 based on the operator's instruction, the correcting section 26 retrieves the device address portion in the catalog data based on the aforementioned table or the like, and corrects the retrieved portion in accordance with the actual hardware configuration or invalidates a command line including the name of a device in the catalog data, which is not included in the actual hardware configuration.

The catalog data corrected in this manner is developed to an operator command by the command developing section 28 referring to the catalog data-operator command correlation table stored in the correlation table storage 24. The program test is executed by the developed operator command.

Figure 2:
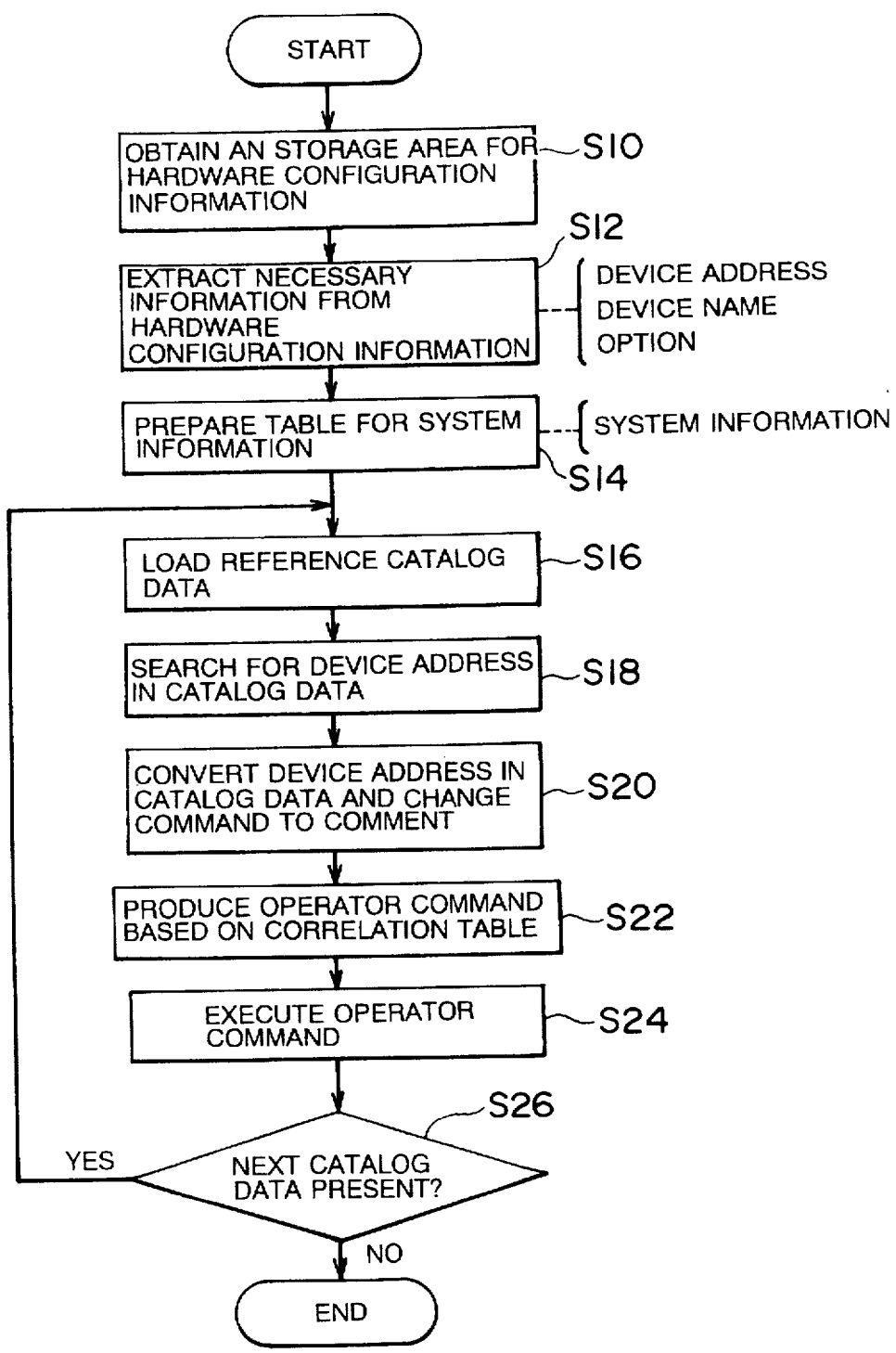
FIG. 2 is a flowchart for explaining the operation of the program testing system in FIG. 1.

With reference to the flowchart illustrated in FIG. 2, a description will now be given of the specific processing of the catalog correction/activation program for correcting the reference catalog data based on the system hardware configuration information and the command format information of the catalog data, which are obtained from the control program, and executing a test based on the corrected catalog data. This processing is executed mainly by the CPU 14.

Figures 3, 4:
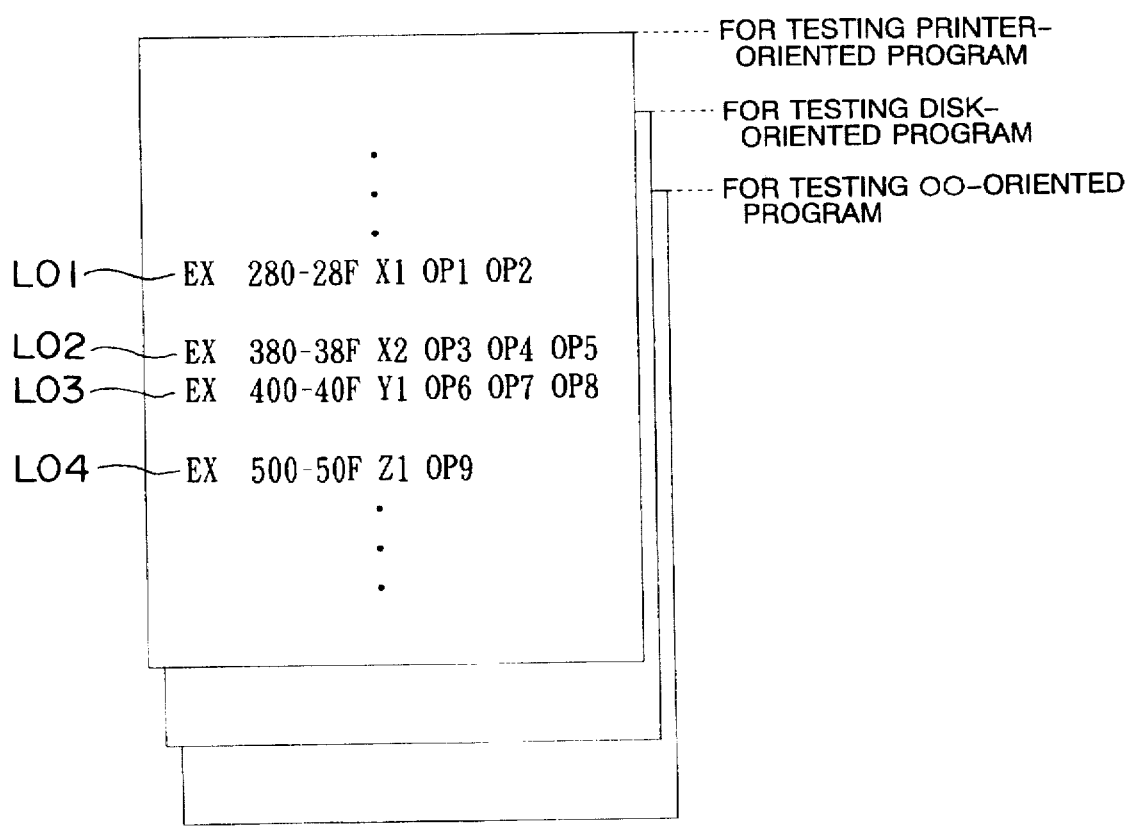
FIG. 3 is an exemplary diagram showing one example of a system information table for explaining the operation of the program testing system in FIG. 1.
FIG. 4 is an exemplary diagram showing one example of reference catalog data for explaining the operation of the program testing system in FIG. 1.

An area in the control program in the control program storage 10 where the system hardware configuration information is stored is checked (step S10), system information including device addresses, device names and optional functions of individual devices is extracted from this hardware configuration information (step S12), and a system information table is prepared based on the system information (step S14). As shown in FIG. 3, the system information table prepared in step S14 consists of individual information items, such as specific device addresses ("0280," "0281," etc. in the illustration) of devices connected to the system, coded device names ("X1," "X2," etc. in the illustration) indicating the devices and a desired number of device function attributes ("OP1," "OP2," etc. in the illustration) indicating the optional function attributes of the devices.

Recorded on a recording medium like a floppy disk, provided for a program test, are typical device-oriented catalog data as model catalog data, such as catalog data for testing a program associated with a printer system and catalog data for testing a program associated with a disk system, as shown in FIG. 4. Those catalog data for individual device systems are used as reference catalog data for testing the respective device-oriented program. Plural pieces of typical catalog data may of course be prepared for the same device system as needed.

A specific example of such catalog data will be explained. For example, catalog data for testing a program for a printer system in FIG. 4 includes the following command line.

"EX 280-28F X1 OP1 OP2"

This command line means that it is for the execution command "EX," the device address is from "280" to "28F," the device name is "X1" and there are two optional function attributes "OP1" and "OP2" for that device. This command line is for invoking a program corresponding to such a device.

Catalog data corresponding to a device system to be tested is read from the provided recording medium and is loaded in the catalog data storage 22 via the medium handling unit 12 (step S16). Next, the positions of parameters of, for example, the device address in the catalog data are checked by referring to the command format table stored in the command format storage 20 (step S18).

Figures 5, 6:
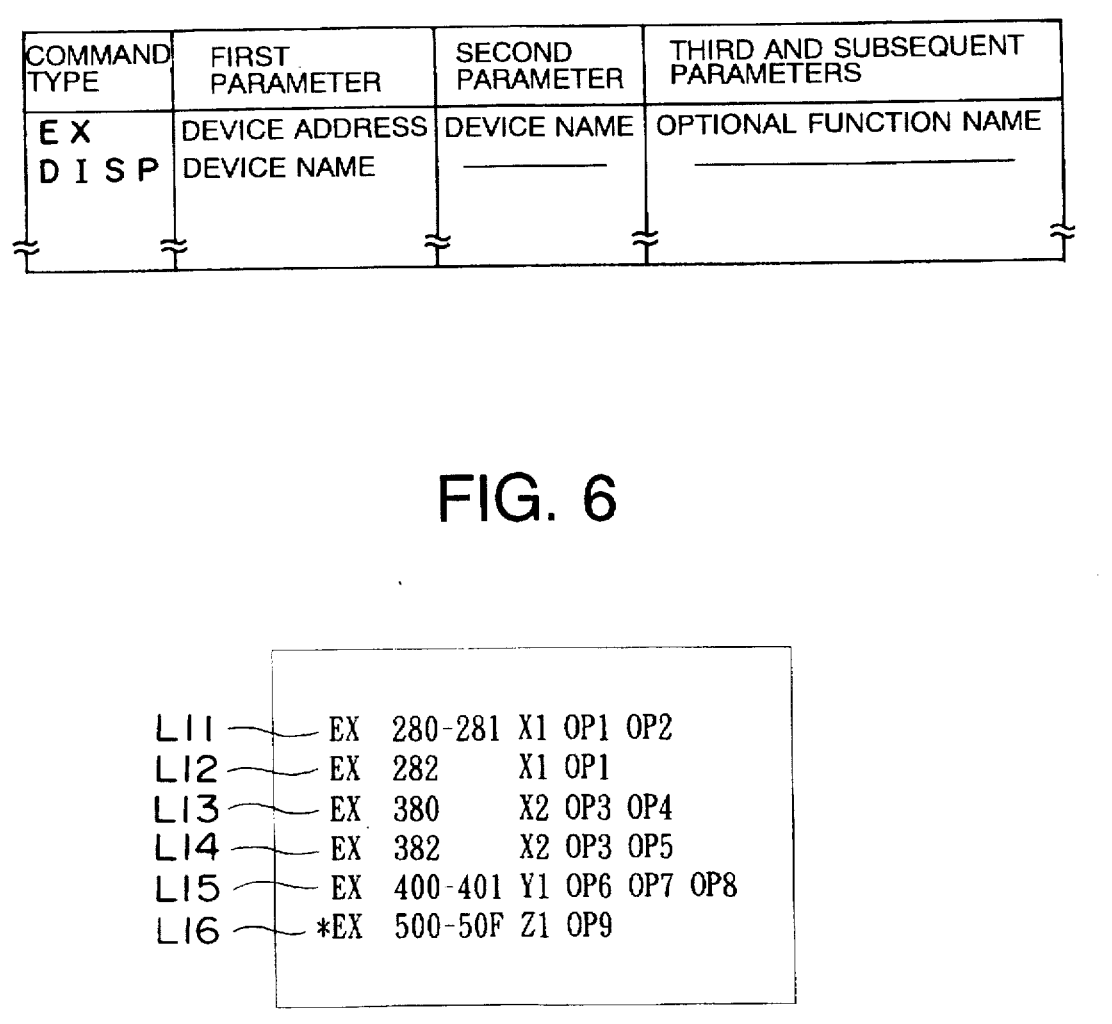

The command format table previously stored in the command format storage 20 consists of command types and a plurality of parameters as syntax information of the catalog data as shown in FIG. 5. The parameters are the associated items selected from the device address, device name, optional function attribute, etc.

Next, the reference catalog data is corrected based on the system information extracted by the system information extractor 18 (step S20). Through the correction of the catalog data, the following operations are performed case by case. When the device address in the system information differs from the reference catalog data, the parameter of the device address in the reference catalog data is changed in accordance with the system information. When the associated device is not in the system information, the associated command line is changed to a comment line or deleted to be invalidated. When the reference catalog data includes no test items or commands corresponding to the devices present in the system information, a command line is newly created in the catalog data.

The correction of catalog data will be specifically discussed with respect to the correction of catalog data for testing a printer-oriented program. The catalog data shown in FIG. 6 is the catalog data shown in FIG. 4 whose command lines LO1 to LO4 are corrected, and consists of command lines L11 to L16. Those command lines will be discussed one by one in association with the command lines LO1 to LO4 of the catalog data shown in FIG. 4.

For Line LO1

With regard to the device X1, the existing device addresses are "280," "281" and "282." There are two optional function attributes, "OP1" and "OP2," for the device addresses "280" and "281" and only one optional function attribute "OP1" for the device address "282." With regard to the command line LO1, therefore, the device address portion is corrected to "280-281" in association with the device addresses "280" and "281," yielding the command line L11 in FIG. 6, and the command line L12 is newly added which has a device address portion of "282" in association with the device address "282" and has only one optional function attribute "OP1."

For Line LO2

With regard to the device X2, the existing device addresses are "380" and "382." There are two optional function attributes, "OP3" and "OP4," for the device address "380" and two optional function attributes, "OP3" and "OP5," for the device address "382." With regard to the command line LO2, both of the device address and optional function attributes should be corrected. More specifically, the device address portion is corrected to "380" in association with the device addresses "380" and the optional function attributes are corrected to "OP3" and "OP4," yielding the command line L13 in FIG. 6, and the device address portion is corrected to "382" in association with the device addresses "382" and the optional function attributes are corrected to "OP3" and "OP5," yielding the command line L14 in FIG. 6. That is, two command lines are produced.

For Line LO3

With regard to the device Y1, the existing device addresses are "400" and "401." The optional function attributes are "OP6," "OP7" and "OP8" for both of the device addresses as for the command line LO3. With regard to the command line LO3, therefore, only the device address is corrected to "400-401," yielding the command line L15 in FIG. 6.

For Line LO4

With regard to the device Z1, there are no existing device addresses, so that the command line LO4 is changed to a comment line to be invalidated. If a comment is a statement affixed at the top with the asterisk "*" and the resultant line is considered as a comment line, the command line can be changed to a comment line by affixing the asterisk "*" at the top of the command line. At the time of developing catalog data to an operator command, a comment and a comment line are disregarded and are not developed to operator commands. Therefore, the asterisk "*" is affixed at the top of the command line LO4 to change the line to the comment line L16 in FIG. 16. In this case, since the command line has only to become invalid, the command line LO4 itself may be deleted.

Then, the catalog data-operator command correlation table is referred on the basis of the catalog data corrected in step S20 to develop the corrected catalog data to the associated operator command (step S22). The catalog data-operator command correlation table is previously set based on the format of the catalog data and the format of the operator command and is stored in the correlation table storage 24.

This catalog data-operator command correlation table shows the correlation between the device names in the catalog data and the program names as parameters of the associated operator commands and the correlation between the optional function attributes for the individual devices and the parameters of the associated operator commands, as exemplified in FIG. 7. For example, the program name associated with the device name "X1" is "TMP1," the parameter associated with the optional function "OP1" of the device name "X1" is "P1," and the parameter associated with the optional function "OP2" of the device name "X1" is "P2."

The development of catalog data to the associated operator command is executed in the following manner. A command in catalog data, "EX," for example, is converted to an operator command "START" to start the execution of the program. A device name in the catalog data, for example, "X1," is converted to the program name, "TMP1" in this case, of the test program of the device "X1." Alternatively, the combination of a command and a device name in catalog data may be changed to the combination of an operator command to start the execution of a program and the program name to be invoked, as needed. The device address in the catalog data, for example, "282," is used directly as the device address which is given to the operator command. The device address in the catalog data, for example, "280-281," may have its format changed as needed to become the device address ("(280-281)" in this case) which is given to the operator command. Further, the optional function attribute in the catalog data, for example, "OP1," is converted to the associated parameter, "P1" in this case.

The development of the catalog data in FIG. 6 in accordance with the catalog data-operator command correlation table in FIG. 7 yields operator commands as shown in FIG. 8.

By executing the thus developed operator commands under the control of the control program, the associated test program is invoked and the program is tested (step S24). Then, it is determined whether or not there is catalog data to be tested (step S26). If there remains some catalog data to be tested, the flow returns to step S16. If there remains no more catalog data to be tested, the processing is terminated.

The catalog data corrected in this manner may be written under the same name as that of the reference catalog data on the provided recording medium via the medium handling unit 12 to replace the original reference catalog data, may be written on the provided recording medium via the medium handling unit 12 as new catalog data having a different name from the name of the original reference catalog data, or may be used only in this test and may be discarded thereafter. It is desirable that the operator can arbitrarily select the proper one from those alternatives.

The automatic correction of catalog data by this program testing system can prevent the occurrence of operational errors and can shorten the correcting time. When the same test items or catalog data is commonly used for a plurality of systems in testing programs, for example, the device addresses in the catalog data are automatically changed and the test items for a device to be tested which does not exist in a specific system are automatically deleted.

In short, this program testing system extracts system information, associated with catalog information for the test items for testing a target program, from the system configuration information which relates to the configuration of the hardware system that runs the target program and which is previously included in the target program, reads reference catalog information of the test items previously prepared for testing a program, automatically correct the reference catalog information based on the system information corresponding to the catalog information and a predetermined command format, and associates a predetermined operator command with the corrected catalog information to develop the catalog information to an operator command which is in turn used in the program test. It is therefore possible to automate a program test using catalog data, thereby reducing operational errors in the program test, and to perform a reliable test in a short period of time.

Second Embodiment

Figure 9:
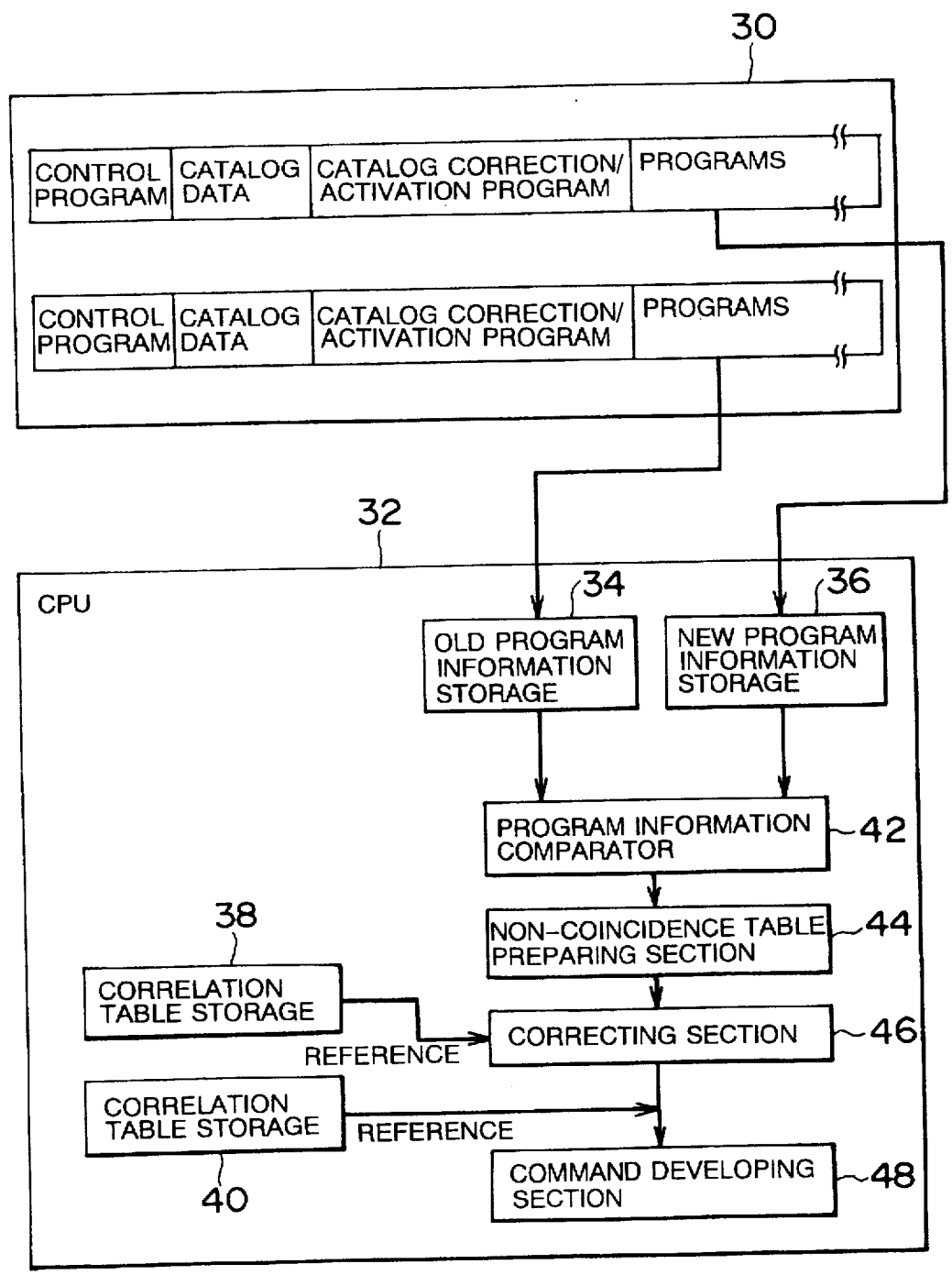
FIG. 9 is a block diagram illustrating the structure of a program testing system according to a second embodiment of this invention.

FIG. 9 shows the structure of a program testing system according to the second embodiment of this invention.

The program testing system in FIG. 9 is designed to test a new or modified program in an ordinary computer system at the time of modifying a program. This program testing system comprises a medium handling unit 30 and a CPU 32. The medium handling unit 30, almost like the medium handling unit 12 in FIG. 1, is a disk apparatus, for example, and accesses a recording medium such as a disk where the control program, catalog data, a catalog correction/activation program and at least one other program are stored. This medium handling unit 30 accesses an old recording medium where the control program, catalog data, a catalog correction/activation program and at lest one other program are stored to present an old program or a program of a version before the modification (old version), and accesses a new recording medium where the control program, catalog data, a catalog correction/activation program and at lest one other program are stored to present a new program or a program of a version after the modification (new version).

The control program is loaded into the main memory of the system, though not clearly illustrated, and is executed by the CPU 32. The control program is normally loaded in advance at the time the system is activated. Further, the control program is read from the new/old recording medium and is loaded into the system as needed by the medium handling unit 30. The catalog data includes commands corresponding to test items for reference or the execution of a test, and device addresses. The catalog correction/activation program is loaded into the main memory of the system and is executed by the CPU 32 to correct the catalog data, develop corrected catalog data to an operator command and execute an operator command to activate a test program. The other programs include separate programs, such as test programs for executing the actual test.

The CPU 32 has an old program information storage 34, a new program information storage 36, a first correlation table storage 38, a second correlation table storage 40, a program information comparator 42, a non-coincidence table preparing section 44, a correcting section 46 and a command developing section 48. The old program information storage 34, the new program information storage 36, the first correlation table storage 38, and the second correlation table storage 40 are a part of the main memory, for example. The program information comparator 42, the non-coincidence table preparing section 44, the correcting section 46 and the command developing section 48 are functional portions which are established by executing the catalog correction/activation program by the CPU 32.

The old program information storage 34 stores old program information, such as the program name (e.g., a file name or command name) of a program in the old recording medium, a version number (or release number), a time stamp (e.g., prepared date) and a program size, read via the medium handling unit 30 from the old recording medium. The new program information storage 36 stores new program information, such as the program name of a program in the old recording medium, a version number, a time stamp and a program size, read via the medium handling unit 30 from the new recording medium.

The first correlation table storage 38 stores a first correlation table showing the correlation between device names in catalog data and program names of programs, which are for testing the associated devices and become options in operator commands. The second correlation table storage 40 stores a second correlation table showing the correlation between commands in catalog data and operator commands corresponding to those commands.

The program information comparator 42 compares program information, such as a program name, a version number, a time stamp and a program size, which is read from the new recording medium and is stored in the new program information storage 36, with similar program information, which is read from the old recording medium and is stored in the old program information storage 34. The non-coincidence table preparing section 44 extracts a program other than the one whose program information from the new and old recording media entirely coincide with each other, i.e., a program whose program information from both recording media contain at least one unmatched item, and prepares a non-coincidence table which is in turn held in, for example, the main memory.

The correcting section 46 automatically corrects reference catalog data based on the aforementioned non-coincidence table. The reference catalog data in this case is catalog data, which has been read from a recording medium and stored in, for example, the main memory by the medium handling unit 30, and which has resulted from the correction of the reference catalog data in association with the hardware configuration such as devices constituting the system. This catalog data may be reference catalog data read from the new recording medium or the old recording medium (which corresponds to the hardware configuration and needs no correction), or may be reference catalog data which has been read from the new recording medium or the old recording medium and manually corrected in accordance with the hardware configuration. The correcting section 46 refers to the first correlation table stored in the first correlation table storage 38 and showing the correlation between device names in catalog data and program names of programs for testing the associated devices to correct the reference catalog data in such a way as to invalidate the command lines in the catalog data which are associated with the devices corresponding to the programs that are not registered in the non-coincidence table. In this case, the invalidation of the command lines is accomplished by changing those command lines to comment lines. Of course, the command lines may be deleted to be invalidated.

The command developing section 48 refers to the catalog data-operator command correlation table, stored in the second correlation table storage 40, to associate catalog data, to which the necessary correction has been made by the correcting section 46, with a predetermined operator command, and develops the catalog data to an operator command. Further, the command developing section 48 tests the program by the execution of the developed operator command.

The operation of the thus constituted program testing system will be described below.

In testing a newly provided program or a newly modified program, the correction of a command line in catalog data is automatically performed so that the catalog data is associated only with the modified program.

The catalog correction/activation program functions under a predetermined control program by the CPU 32. The catalog correction/activation program causes the CPU 32 to read program information, such a program name, a version number, a time stamp and a program size, from the new recording medium and store the program information in the new program information storage 36 (main memory) via the medium handling unit 30. Likewise, the CPU 32 reads program information, such a program name, a version number, a time stamp and a program size, from the old recording medium and stores the program information in the old program information storage 34 (main memory) via the medium handling unit 30.

The program information comparator 42 compares a program name, a version number, a time stamp, a program size, etc. in the program information stored in the new program information storage 36, piece by piece, with those in the program information stored in the old program information storage 34, to determine if both information coincides or not. The non-coincidence table preparing section 44 extracts a program whose program information contains some unmatched item, and prepares a non-coincidence table showing such a program as a new or modified program.

The correcting section 46 refers to the first correlation table showing the correlation between device names in the catalog data previously stored in the first correlation table storage 38 and the names of programs for testing those devices, and invalidates command lines in the reference catalog data, associated with the hardware configuration of this system, other than those associated with programs registered in the non-coincidence table.

The catalog data corrected in this manner is developed to an operator command by the command developing section 48 referring to the second correlation table showing the correlation between catalog data and operator commands, previously stored in the second correlation table storage 40. The program test is executed by the developed operator command.

Figure 10:
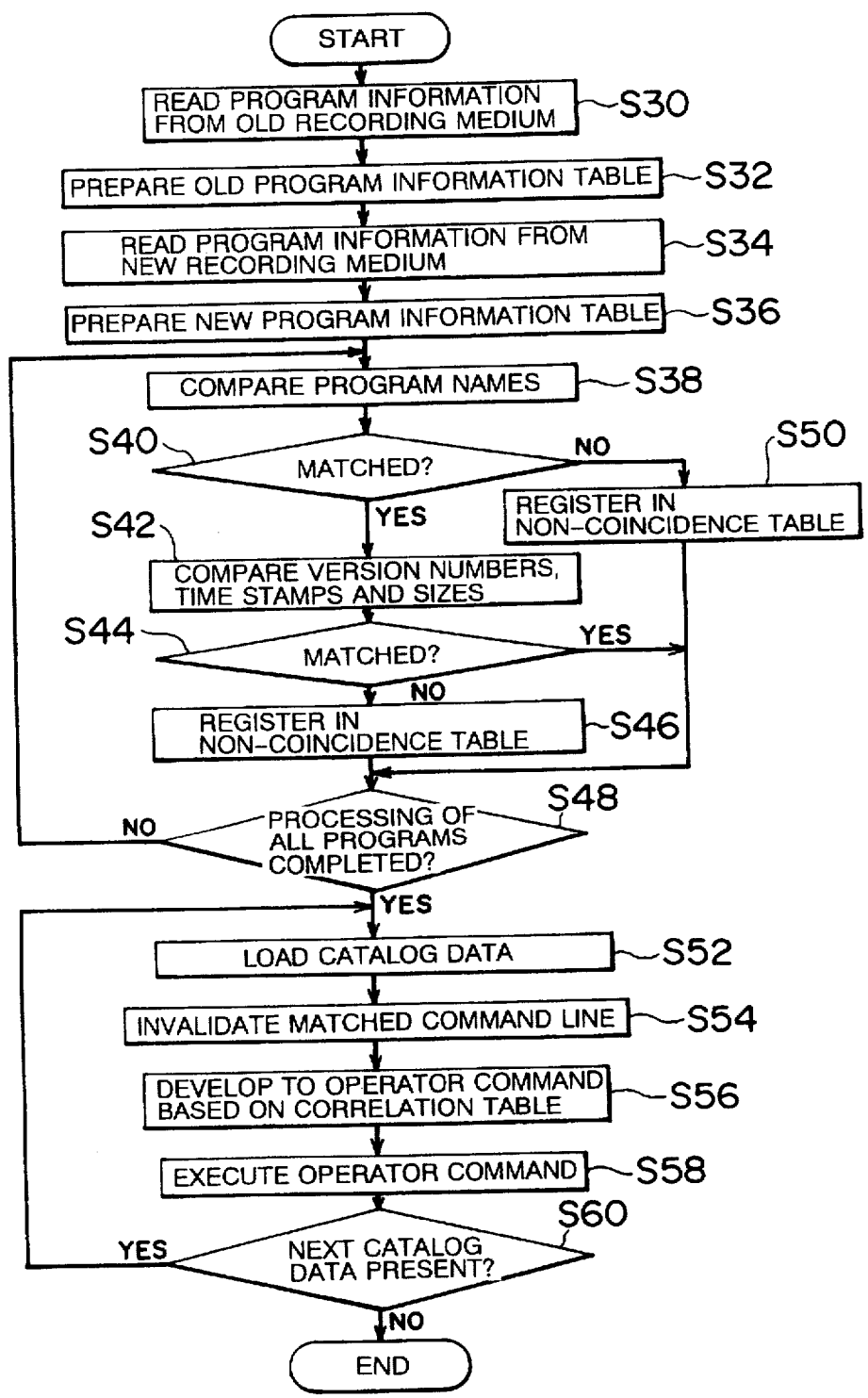
FIG. 10 is a flowchart for explaining the operation of the program testing system in FIG. 9.

With reference to the flowchart illustrated in FIG. 10, a description will now be given of the specific processing of the catalog correction/activation program for correcting and executing reference catalog data in such a way that a new that a new or modified program is specified by comparing program information, such as a program name, a version number, a time stamp and a program size, which is read from the new recording medium, with those in the old recording medium, and command lines other than those associated with the new or modified program are invalidated by referring to the first correlation table for the device names and program names. This processing is executed mainly by the CPU 32.

The medium handling unit 30 reads from the old recording medium a record where program information, such as a program name, a version number, a time stamp and a program size (step S30), sorts the program information in the order of, for example, program names, and stores the sorted program information as an old program information table in the old program information storage 34 (step S32).

FIG. 11 exemplifies the sorted old program information table storage stored in the old program information storage 34. FIG. 11 presents the table which shows old program information consisting of program names, version numbers, time stamps and program sizes and sorted in the order of program names. With regard to the first line, the program name is "A," the version number is "0101," the time stamp is "930630" and the program size is "X'000100'." The version number "0101" indicates the "release 1 of version 1," the time stamp "930630" indicates "Jun. 30, 1993," and the program size "X'000100'" indicates "100" bytes in the hexadecimal notation or "256" bytes in the decimal notation. Such program information is arranged in each line in the order of the program names "A"→"B"→"TMP1"→"TMP2"→.

The medium handling unit 30 reads from the new recording medium a record where program information, such as a program name, a version number, a time stamp and a program size (step S34), sorts the program information in the order of, for example, program names, and stores the sorted program information as an old program information table in the old program information storage 34 (step S36).

FIG. 12 exemplifies the sorted new program information table storage stored in the new program information storage 36. FIG. 12 presents the table which shows new program information consisting of program names, version numbers, time stamps and program sizes and sorted in the order of program names. In this case, the program information is arranged in each line in the order of the program names "A"→"B"→"TMP1"→"TMP2"→"TMP3"→.

Next, the program information comparator 42 compares a program name in the old program information table stored in the old program information storage 34 with a program name in the new program information table stored in the new program information storage 36 (step S38) and the non-coincidence table preparing section 44 determines if the program names coincide with each other (step S40). When the program names coincide with each other, the program information comparator 42 further compares the version number, time stamp and program size in the old program information with those in the new program information (step S42), and the non-coincidence table preparing section 44 determines if there is any unmatched item or if not all the items in the old program information coincide with the associated ones in the new program information (step S44). If there is at least one unmatched item or if not all the items in the old program information match with those in the new program information, the non-coincidence table preparing section 44 registers the corresponding program information in the non-coincidence table (step S46) and then determines if the comparison has been completed for all the programs (step S48).

When determining in step S40 that there is an unmatch, the non-coincidence table preparing section 44 registers the program information corresponding to that program in the non-coincidence table (step S50) after which the flow moves to step S48. When the non-coincidence table preparing section 44 determines in step S44 that there is a match, the flow directly proceeds to step S48. When the non-coincidence table preparing section 44 does not determine in step S48 that the comparison has not been completed for every program, the flow returns to step S38.

FIG. 13 exemplifies the non-coincidence table prepared by the non-coincidence table preparing section 44. In FIG. 13, because the program "A" differs in the version number, time stamp and program size, it is apparent that the program has been modified. Since the program "TMP1" differs in the version number and program size though having the matched time stamp, it is apparent that the program has been modified. Since the name of the program "TMP3" itself does not exist in the old recording medium, it is understood that this program is a new program. Those program names are registered together with the version numbers, time stamps and program sizes in the new recording medium in the non-coincidence table.

When the non-coincidence table preparing section 44 determines in step S48 that the comparison and registration have been completed for all the programs, the correcting section 46 loads reference catalog data from the new recording medium via, for example, the medium handling unit 30 (step S52). It is desirable that this reference catalog data is the one which has already undergone the correction according to the system hardware configuration as in the case of the above-described system illustrated in FIG. 1. If the reference catalog data does not accord to the system hardware configuration, therefore, the correction similar to the one done by the system in FIG. 1 may be performed prior to the following processing. The following description will be given on the assumption that the reference catalog data has already undergone the correction according to the system hardware configuration.

When the reference catalog data is loaded, the correcting section 46 refers to the first correlation table previously stored in the first correlation table storage 38 and the non-coincidence table, and invalidates command lines associated with an unmodified program in the reference catalog data, not a new or modified program (step S54).

When the catalog data as in FIG. 6 is loaded, in step S54, the correcting section 46 refers to the first correlation table showing the correlation between previously, stored in the first correlation table storage 38 and showing the correlation between device names and programs as shown in FIG. 14, and the non-coincidence table, and invalidates command lines associated with an unmodified program, not a new or modified program by changing those command lines to comment lines. As the first correlation table, a part of the catalog data-operator command correlation table in FIG. 7 may be used directly. As the program names in the non-coincidence table are "A," "TMP1," and "TMP3" with respect to the catalog data as shown in, for example, FIG. 6, those program names are converted to device names, eliminating the need for the other command lines than those for "T1," "X1" and "Y1," and the unnecessary command lines are changed to comment lines as shown in FIG. 15.

Then, the second correlation table which shows the correlation between catalog data and operator commands is referred based on the catalog data corrected in step S56, and the corrected catalog data is developed to the associated operator command (step S56). The second correlation table, similar to the one in FIG. 7, is previously stored in the second correlation table storage 40.

The development of catalog data to the associated operator command is executed in the following manner based on the relationship between the command format of the catalog data and the command format of operator commands, as shown in FIG. 16. FIG. 16 shows that a command "EX" in catalog data, the first parameter "device address," the second parameter "device name" and the third and subsequent parameters "optional functions" respectively correspond the operator command "START," the first parameter "program name," the second parameter "device address" and the third and subsequent parameters "parameter." Therefore, the command "EX" in the catalog data is converted to the operator command "START" to start the execution of the program. The device name in the catalog data, for example, "X1," is converted to the program name, "TMP1" in this case, of the test program of the device "X1." Alternatively, the combination of a command and a device name in catalog data may be changed to the combination of an operator command to start the execution of a program and the program name to be invoked, as needed. The device address in the catalog data, for example, "280–281," has its format changed as needed to become the device address ("(280–281)" in this case) which is given to the operator command. Further, the optional function attribute in the catalog data, for example, "OP1," is converted to the associated parameter, "P1" in this case.

The development of the catalog data in FIG. 15 in accordance with the catalog data-operator command correlation table in FIG. 7 yields operator commands as shown in FIG. 17.

By executing the thus developed operator commands under the control of the control program, the associated test program is invoked and the program is tested (step S58). It is then determined whether or not there is catalog data to be tested (step S60). If there remains some catalog data to be tested, the flow returns to step S52. If there remains no more catalog data to be tested, however, the processing will be terminated.

The automatic correction of catalog data associated only with a modified portion by this program testing system can prevent the occurrence of operational errors and can shorten the correcting time. When a new or modified program is to be tested, the portion of the existing program in the catalog data which are associated with items to be tested is automatically deleted.

In short, this program testing system reads program information consisting of at least partial information including program names among the names of separate programs, version numbers, time stamps and program sizes, from a medium which provides unmodified programs and a medium which provides modified programs, extracts unmodified program name information for which the program information from both media completely coincide with each other, invalidates catalog information corresponding to the separate program associated the unmodified program name information, thereby correcting the catalog information. Consequently, it is possible to test only the modified portion in the program.

Third Embodiment

Figure 18:
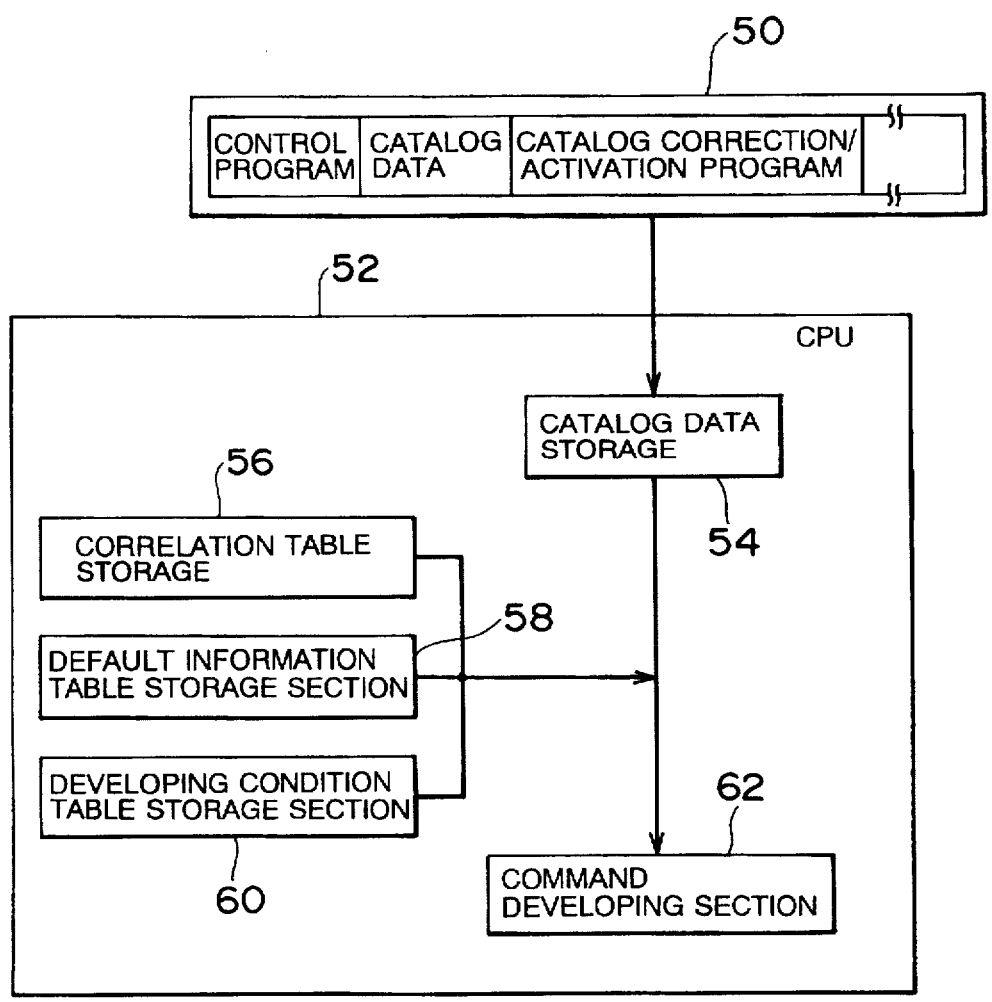
FIG. 18 is a block diagram illustrating the structure of a program testing system according to a third embodiment of this invention.

FIG. 18 shows the structure of a program testing system according to the third embodiment of this invention.

The program testing system in FIG. 18 is designed to test a program in an ordinary computer system in consideration of the variation of operator commands. This program testing system comprises a medium handling unit 50 and a CPU 52. The medium handling unit 50, almost like the medium handling unit 12 in FIG. 1, is a disk apparatus, for example, and accesses a recording medium such as a disk where the control program, catalog data, and a catalog correction/activation program are stored.

The catalog correction/activation program is loaded into the main memory of the system and is executed by the CPU 52 to develop the catalog data to an operator command and execute an operator command to activate a test program.

The CPU 52 has a catalog data storage 54, a correlation table storage 56, a default information table storage 58, a developing condition table storage 60, and a command developing section 62. The catalog data storage 54, the correlation table storage 56, the default information table storage 58 and the developing condition table storage 60 are a part of the main memory, for example. The program information comparator 62 is a functional portion which is established by executing the catalog correction/activation program by the CPU 52.

The catalog data storage 54 stores reference catalog data, read from a recording medium provided for the test. That is, the reference program size in this case is, for example, the catalog data which has been read from the recording medium and is stored in, for example, the main memory via the medium handling unit 50, and is the one which has undergone the correction according to the hardware configuration such as the devices constituting the system, as in the above-described system in FIG. 1. Alternatively, the reference catalog data which has undergone the correction according to the hardware configuration such as the devices constituting the system may further be corrected in such a way as to invalid the command lines in the catalog data which are associated with the devices corresponding unmodified programs. However, this catalog data may be reference catalog data read from the new recording medium or old recording medium (which accords to the hardware configuration and the modification/non-modification and which needs no correction), or may be reference catalog data which has been read from the new recording medium or old recording medium and has been manually corrected.

The correlation table storage 56 previously stores the correlation table showing the correlation between catalog data and operator commands, which is necessary for developing the catalog data to an operator command. The default information table storage 58 previously stores a table of default information which is used when parameters or the like of command in operator commands are not specified. The developing condition table storage 60 previously stores a developing condition table showing how to apply the variation of the command format, which accomplishes the same function on the command format of an operator command, to develop the catalog data to an operator command.

The command developing section 62 refers to the catalog data-operator command correlation table stored in the correlation table storage 56, the default information, which is stored in the default information table storage 58 and is used when the parameters or the like of operator commands are not specified, and the developing condition table for the variation of the command format stored in the developing condition table storage 60, to associate a predetermined operator command with the catalog data stored in the catalog data storage 54, and develops the catalog data to an operator command according to the developing condition table. Further, the command developing section 54 allows the program to be tested by executing the developed operator command.

The operation of the thus constituted program testing system will now be discussed. In the case where the default values of parameters or the like in operator commands are "specifically" or actually designated on command statements, or "unspecifically" designated, i.e., no default values are designated on command statements but are automatically selected when nothing is designated, it is necessary to develop one command line in the catalog data to a plurality of operator commands in order to check if different designations provides the same processing. In this case, the development of the catalog data to operator commands including some variations.

The catalog correction/activation program functions under a predetermined control program by the CPU 52. This catalog correction/activation program permits the CPU 52 to function as follows. The CPU 52 reads reference catalog data from a supplied recording medium and stores it in the catalog data storage 54 via the medium handling unit 50. The command developing section 62 uses the command developing condition table previously registered in the developing condition table storage 60 to automatically develop the catalog data, stored in the catalog data storage 54, to various operator commands in accordance with the desired variation corresponding to the command developing condition table.

With reference to the flowchart in FIG. 19, a description will be given of the specific processing of the catalog correction/activation program, which uses the command developing condition table, previously registered, at the time of developing catalog data to operator commands, so that the catalog data is automatically developed to operator commands according to the variation of the command formats based on the command developing condition. This processing is mainly executed by the CPU 52.

The catalog data-operator command correlation table and the default information table of commands are previously stored in the respective correlation table storage 56 and default information table storage 58. Further, a desired command developing condition table according to the variation of the command formats to be used at the time of developing the catalog data to operator commands should be stored in the developing condition table storage 60 prior to the developing process.

First, the reference catalog data is read from the recording medium and is stored in the catalog data storage 54 via the medium handling unit 50 (step S70). Then, the correction similar to one or both of the corrections done by the system in FIG. 1 and the system in FIG. 9 is performed as needed, though not illustrated in details (step S72). The correction of the catalog data, if unnecessary or if the system cannot cope with such a function, may be omitted. When the reference catalog data is corrected, the corrected catalog data is stored again in the catalog data storage 54 to update the catalog data in the catalog data storage 54.

Next, the catalog data in the catalog data storage 54 is developed to operator commands based on the catalog data-operator command correlation table, as shown in FIG. 16, which has been stored in the correlation table storage 56 previously (step S74). At this time, for example, the catalog data as shown in FIG. 6 is temporarily developed to the catalog data as shown in FIG. 8 in accordance only with the catalog data-operator command correlation table in the correlation table storage 56 as done by the system in FIG. 1. Further, the developed operator commands are developed again in accordance with the command developing condition table as shown in, for example, FIG. 20, stored in the developing condition table storage 60 and based on the default information table as shown in, for example, FIG. 2, stored in the default information table storage 58, and the device address format as shown in FIG. 22, which has previously been set in the system as a part of the command format information.

Figures 19, 20:
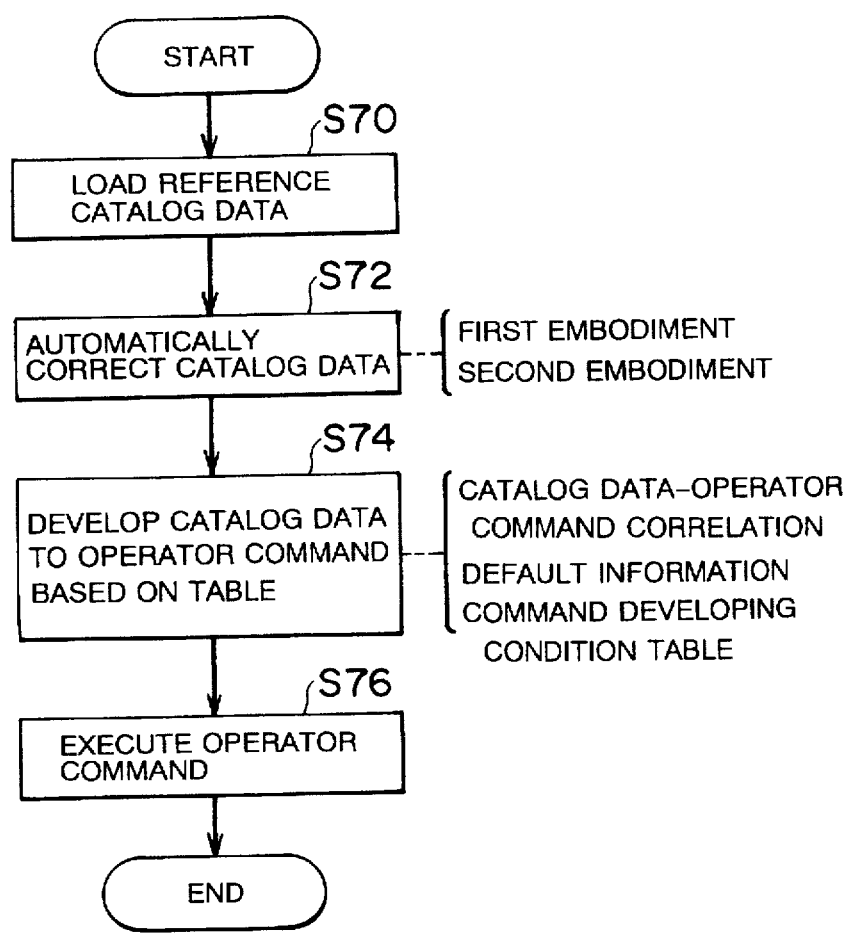
FIG. 19 is a flowchart for explaining the operation of the program testing system in FIG. 18.
FIG. 20 is an exemplary diagram showing one example of a developing condition table for explaining the operation of the program testing system in FIG. 18.

Set in the developing condition table in FIG. 20 are a condition "TMP1 (PARA=DEF)" which "develops the parameter value associated with the program "TMP1 to the default value" and a condition "ALL (DEVAD)" which "performs the development to device addresses with respect to all the programs."

The default information table in FIG. 21 has default parameter values registered for the individual programs. According to the default information table in FIG. 21, for example, "P1" is selected for the program "TMP1" when the first parameter is not specified, and "P2" is selected when the second parameter is not specified. Likewise, for the program "TMP2," "P3" is selected when the first parameter is not specified, "P4" is selected when the second parameter is not specified and "P5" is selected when the third parameter is not specified. Likewise, for the program "TMP3," "P6" is selected when the first parameter is not specified. The device address format in FIG. 22 indicates that the format "XXX—XXX" and the format "(XXX, XXX, XXX)" having individual addresses in the same range arranged side by side have a similar meaning in specifying the device address. At the time of developing catalog data to operator commands for a test, the test is conducted for both formats, so that it is necessary to develop the description of one format to the description of the other format.

In step S74, this development to operator command ensures the development of the catalog data to the operator commands according to the variation of the commands in accordance with the developing condition. For example, when the catalog data in FIG. 6 is developed using the catalog data-operator command correlation table in FIG. 16, the developing condition table in FIG. 20, the default information table in FIG. 21 and the device address format in FIG. 22, the catalog data is developed to the operator commands as shown in FIG. 23.

By executing the thus developed operator commands under the control of the control program, the associated test program is invoked and the program is tested (step S76), and the processing will be terminated.

The automatic execution of a test for various allowable formats by executing the development also to the operator commands in the allowable variation of the command formats by the program testing system can prevent the occurrence of operational errors and can shorten the correcting time. When there are several ways of designating parameters in operator commands, for example, the necessary tests are automatically added.

In short, according to this program testing system, condition information for developing catalog data to operator commands for the variation of the command formats is previously registered and the development to operator commands is performed in accordance with the registered condition information, so that a test can effectively and surely performed even for the variation of the command formats.

It is apparent that, in this invention, a wide range of different working modes can be formed based on the invention without deviating from the spirit and scope of the invention.

What is claimed is:

1. A program testing method comprising:
    an information extraction step for extracting system information corresponding to catalog information of test items for testing a target program from system configuration information about a structure of a hardware system for executing said target program, said system configuration information being previously included in said target program;
    a reference catalog reading step for reading reference catalog information of test items previously prepared for testing a program;
    a catalog correcting step for automatically correcting said reference catalog information based on system information corresponding to said catalog information and a predetermined command format; and
    a command developing step for associating a predetermined operator command with corrected catalog information to develop said catalog information to an operator command and using said operator command in testing said program.

2. The method according to claim 1, further comprising an unmodified program extracting step for reading program information consisting of at least partial information including a program name among information about a name of each program, a version number, a time stamp and a program size from a medium for providing an unmodified program and a medium for providing a modified program, and extracting unmodified program name information for which said program information in both media fully match with each other; and
    wherein said catalog correcting step includes an unmodified item invalidating step for invalidating catalog information corresponding to individual programs associated with said unmodified program name information.

3. The method according to claim 1, further comprising a condition registering step for previously registering condition information of a command development about a variation in a command format of an operator command; and
    wherein said command developing step includes a step of executing a development to an operator command in accordance with registered condition information.

4. A program testing method comprising:
    an unmodified program extracting step for reading program information consisting of at least partial information including a program name among information about a name of each program, a version number, a time stamp and a program size from a medium for providing an unmodified program and a medium for providing a modified program, and extracting unmodified program name information for which said program information in both media fully match with each other;
    a reference catalog reading step for reading reference catalog information of test items previously prepared for testing a program;
    a catalog correcting step for automatically correcting said reference catalog information to invalidate catalog information corresponding to system information corresponding to individual programs associated with said unmodified program name information; and
    a command developing step for associating corrected catalog information with a predetermined operator command to develop said catalog information to an operator command and using said operator command in testing said program.

5. The method according to claim 4, further comprising a condition registering step for previously registering condition information of a command development about a variation in a command format of an operator command; and wherein said command developing step includes a step of executing a development to an operator command in accordance with registered condition information.

6. A program testing apparatus comprising:

information extraction means for extracting system information corresponding to catalog information of test items for testing a target program from system configuration information about a structure of a hardware system for executing said target program, said system configuration information being previously included in said target program;

reference catalog reading means for reading reference catalog information from an information providing medium;

command format storage means for storing a command format of commands used in said catalog information;

catalog correcting means for correcting said reference catalog information based on said system information and said command format;

correlation information storage means for storing correlation information of a correlation between said catalog information and an operator command; and command developing means for associating a predetermined operator command with catalog information, corrected by said catalog correcting means based on said correlation information, to develop said catalog information to an operator command to be used in testing said program.

7. The apparatus according to claim 6, further comprising:

program information reading means for reading program information consisting of at least partial information including a program name among information about a name of each program, a version number, a time stamp and a program size from a medium for providing an unmodified program and a medium for providing a modified program; and unmodified program extracting means for extracting unmodified program name information for which said program information in both media fully match with each other; and wherein said catalog correcting means includes unmodified item invalidating means for invalidating catalog information corresponding to individual programs associated with said unmodified program name information.

8. The apparatus according to claim 6, further comprising condition registering means for previously registering condition information of a command development about a variation in a command format of an operator command; and wherein said command developing means includes means for executing a development to an operator command in accordance with said registered condition information.

9. A program testing apparatus comprising:

program information reading means for reading program information consisting of at least partial information including a program name among information about a name of each program, a version number, a time stamp and a program size from a medium for providing an unmodified program and a medium for providing a modified program;

unmodified program extracting means for extracting unmodified program name information for which said program information in both media fully match with each other;

reference catalog reading means for reading reference catalog information of test items for testing a program, from an information providing medium;

catalog correcting means for correcting said reference catalog information to invalidate catalog information corresponding to system information corresponding to individual programs associated with said unmodified program name information;

correlation information storage means for storing correlation information of a correlation between said catalog information and an operator command; and command developing means for associating a predetermined operator command with catalog information, corrected by said catalog correcting means based on said correlation information, to develop said catalog information to an operator command to be used in testing said program.

10. The apparatus according to claim 9, further comprising condition registering means for previously registering condition information of a command development about a variation in a command format of an operator command; and wherein said command developing means includes means for executing a development to an operator command in accordance with said registered condition information.

* * * * *